April 5, 1927.

T. T. KING

AUTOMATIC PRESSURE REGULATOR

Filed March 18, 1924

1,623,842

Inventor:
Terry T. King,
by
His Attorney.

Patented Apr. 5, 1927.

1,623,842

UNITED STATES PATENT OFFICE.

TERRY T. KING, OF FORT WAYNE, INDIANA, ASSIGNOR TO GENERAL ELECTRIC COMPANY, A CORPORATION OF NEW YORK.

AUTOMATIC PRESSURE REGULATOR.

Application filed March 18, 1924. Serial No. 700,187.

My invention relates to automatic pressure regulators and is particularly applicable to such regulators for controlling an electric motor which is used to furnish power to an air pump or the like.

In pressure regulators of the type contemplated by my invention it has been customary to operate the control switch by a diaphragm which is exposed to, and moved in response to changes in the pressure of the regulated system. In these regulators a pressure spring is provided which opposes the effect of the pressure upon the diaphragm and determines the pressures at which the switch will operate. Regulators of this type have a definite range, depending upon the type of diaphragm, the friction of the mechanism, and the size and shape of the pressure spring. In referring to the range of the regulator, I mean the difference in the pressures at which the switch opens and closes. These regulators can be adjusted to maintain various different pressures upon a system but the range of the regulator, neglecting friction, will remain substantially constant. To vary the pressure which such a regulator will maintain it has been usual heretofore to provide means for changing the amount of compression or tension of the pressure spring and thus change the amount of force necessary to be exerted upon the diaphragm to operate the switch.

Regulators having the above features have been found to operate satisfactorily when applied to high pressure systems or where it is only necessary to maintain the pressure within relatively wide limits of a predetermined desired pressure. These regulators, however, are not so well adapted to low-pressure or vacuum systems for the reason that the range of the regulator is often not suitable for operation at the pressures to be maintained on such a system.

It is, therefore, the object of my invention to provide a more sensitive means which can be used to vary the range of such a regulator irrespective of the size and shape of the pressure spring. This I accomplish in accordance with my invention by providing independent range adjusting means which are effective to vary either limit of the range.

Figure 1:
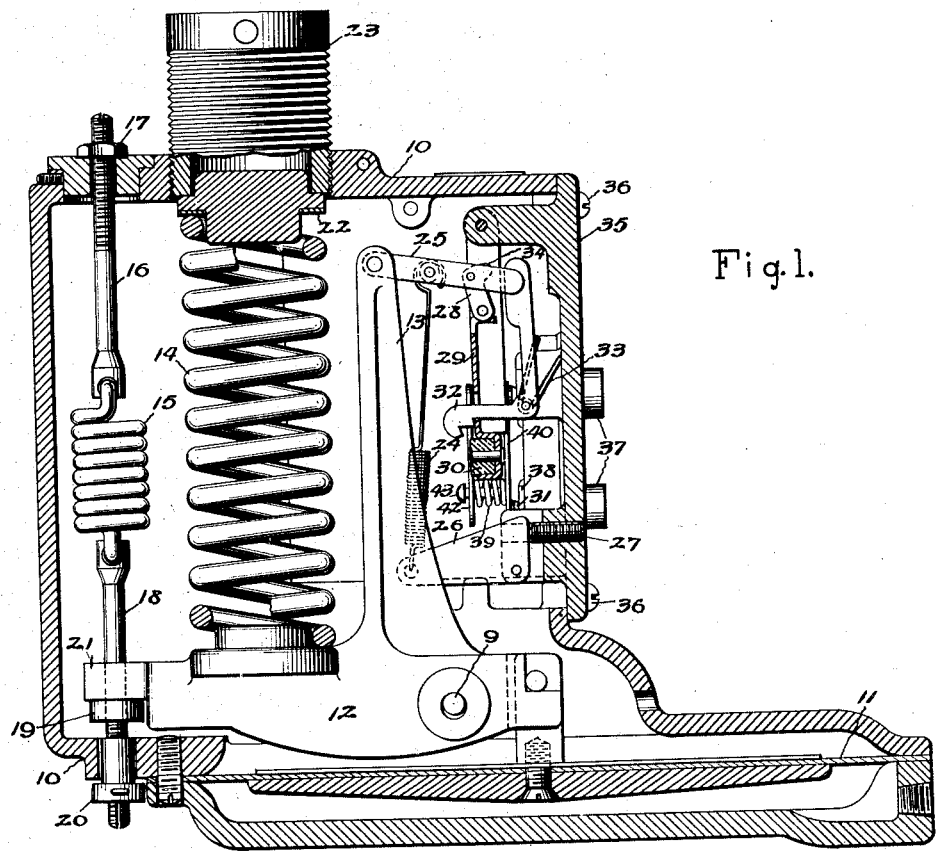
Figure 2:
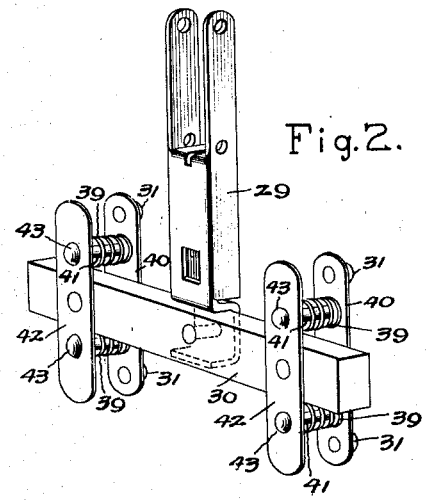

Other features of novelty which characterize my invention are pointed out with particularity in the claims annexed to and forming a part of this specification. For a better understanding of my invention reference may be had to the following description taken in connection with the accompanying drawing in which Fig. 1 is an elevation of a regulator embodying my invention, and Fig. 2 is a perspective view of a switch member used in the regulator of Fig. 1.

The regulator shown in the drawing, embodying my invention, has a diaphragm 11 which is opposed by a pressure spring 14 and adjacent the pressure spring 14, acting in opposition thereto, is an adjustable range adjusting spring 15. This range adjusting spring is mounted within a casing 10, upon rods 16, 18 which form an adjustable supporting means, and cooperates with the pressure of the controlled system, as described hereinafter, to modify the effect of the pressure spring 14 on the switch closing limit of the range of the regulator. In addition to the range adjusting spring 15 I provide a second range adjusting spring 24 which co-operates with the switch mechanism, as will be described more fully hereinafter, to operate the switch at the proper time and also modify the range of the regulator on the switch opening limit of the range of the regulator.

The structure which I have shown in the drawing and which embodies my invention, is designed for use in connection with a vacuum system in which the electric motor is used to drive a vacuum pump. The switch is arranged to automatically open the circuit and thus stop the motor when the vacuum of the system reaches a predetermined high value, and to close the switch and start the motor when the vacuum reaches a predetermined low value, all in a manner which is well known to those skilled in the art. Hence, a description of the circuits in which the switch is intended to be associated, is deemed unnecessary.

Referring to the drawing, in more detail, a pivot 9 is shown within the casing 10 for pivotally supporting a lever 12. This lever 12 is biased in a downwardly direction by the pressure spring 14 and is moved in an upwardly direction by the diaphragm 11 when the vacuum of the controlled system is sufficient to overcome the downward bias caused by the spring 14. The spring 14 engages a spring seat 22 carried by a threaded sleeve 23 which can be adjusted to vary the amount of the downward bias exerted upon the lever 12. An arm 13 projects upwardly from the lever 12 and is connected through a suitable mechanism to an electric switch which is adapted to control the pressure producing apparatus.

As a means of modifying the effect of the pressure spring 14 upon lever 12 and the diaphragm 11 a second, or range adjusting, spring 15 is provided which exerts a force upon the lever 12 in a direction opposite to that of the pressure spring 14. This range adjusting spring 15 is supported within the casing 10 on an adjustable rod 16 which can be secured by means of a nut 17 in a number of different positions to vary its effectiveness. The lower end of the range adjusting spring 15 is attached to a rod 18 which passes through the casing 10 and cooperates with the rod 16 to form an adjustable support for the range adjusting spring 15. A collar 19 and a stop 20 are mounted upon the rod 18 and co-operate with the adjustable support of spring 15 to operatively connect spring 15 to the regulator. The collar 19 is adapted to engage a forked end 21 on the lever 12, and when so engaging the lever 12, it transmits the force exerted by the range adjusting spring 15 to the lever 12 to thus partially oppose the force exerted upon the lever 12 by the pressure spring 14 when the lever 12 is moving downward or in the switch closing direction. When the regulator is operating in the switch opening direction the stop 20 is adapted to engage the casing 10 just prior to the opening of the switch and thus prevent the range adjusting spring 15 from exerting any force upon the lever 12, tending to open the switch. By turning the nut 17 which is carried by the rod 16 the tension of the range adjusting spring 15 can be adjusted to any desired degree to thereby vary its range adjusting effect.

The switch mechanism shown in the drawing is of the quick acting type. It is operated by a spring 24 which is connected at one end to a link 25 and at its other end to a movable bell crank member 26. The movable bell crank member 26 is adapted to be moved and held in a number of different positions by a set screw 27 to thereby vary the tension on the spring 24, and thus vary the effectiveness of the spring to change the range of the regulator. The link 25 due to the tension on the spring 24 is biased downwardly and exerts a pressure on a link 28 which is secured between the projecting end of the link 25 and a pivoted switch member 29. This pivoted member 29 carries an insulating member 30 to which is secured a plurality of contacts 31. These contacts 31 after being moved into closed position are held there by a locking dog 32 which engages the pivot member 29. This locking dog also cooperates with the link 28 to give the pivoted member 29 a snap-action when the contacts 31 are opened. A spring 33 is provided to bias the locking dog 32 into engagement with the pivoted member 29 when the switch is closed, and a nose 34 on the link 28 acts to overcome the spring 33 when the switch is about to open. The switch mechanism is mounted upon a detachable member 35 which is secured to the casing 10 by means of screws 36. This member is provided with bushings 37 and adjacent to these bushings 37 are stationary contacts 38 to which the external electric circuits are connected. As the switch is moved to the closed position the contacts 31 will engage the stationary contacts 38 and close the respective circuits connected thereto. In order to insure an even contact between all the contacts I provide springs 39 which bias the contacts 31 toward the stationary contacts 38. The contacts 31 as illustrated in Fig. 2, are mounted in pairs on current conducting strips 40 which have pins 41 projecting away from the contacts and passing through a cross-arm 42. The pins 41 move freely through the cross-arm 42 and are prevented from becoming detached therefrom by the heads 43 formed on the ends of the pins.

The operation of my improved regulator may be explained as follows: When the parts are in the position shown in the drawing the motor will be energized and the pump will be operating to increase the vacuum of the system. As the vacuum increases, the diaphragm 11 will be moved slowly downwardly thus exerting a pull upon the lever 12 and compressing the pressure spring 14. This will move arm 13 to the right, extend the spring 24, and cause the pivot of the link 25 to pass over center and beyond the pivot of the pivoted switch member 29. In this position the pivoted switch member 29 will be biased outward toward the switch open position by the spring 24. As the arm 13 continues to move to the right the nose 34 on link 28 will strike the locking dog 32, release the pivoted member 29 and permit the spring 24 to move the switch contacts 31 away from the stationary contacts 38 to open the motor circuit and stop the pump.

When the vacuum decreases the diaphragm will move in the reverse direction, or upwardly, due to the pressure exerted upon the lever 12 by the pressure spring 14. This will move arm 13 to the left, and when a predetermined low value of vacuum is reached, the pivot of the link 28 will again pass over the center of the pivot 29 and by reason of the tension in spring 24 cause pivot lever 29 to snap into the circuit closed position, thus starting the electric motor and the pump to again increase the vacuum of the system.

The operation just described presupposes no range adjustment by means of springs 14 or 24. Under these conditions, a regulator of the type shown in the drawing, without my range adjustment springs, will have a range depending upon the setting of the pressure spring 14 and the vacuum of the system. For purpose of illustration, assume that the pressure spring 14 is set to require a vacuum corresponding to a pressure of 10″ of mercury to open the switch. Such a regulator will close the switch again when the vacuum falls to a pressure corresponding to 7½″ of mercury. In other words, the range of the regulator will be a difference of pressure corresponding to 2½″ of mercury.

On the other hand, consider my regulator provided with range adjusting springs 15 and 24 and assume now that it is desired to change the range of the regulator in the switch closing direction without disturbing the value of the maximum setting, (10″ of mercury). To do this, the range adjusting spring 15 is placed under tension by turning the nut 17 on the rod 16. This will bias rod 18, collar 19 and stop 20 upwardly, and cause spring 15 to exert a pressure on lever 12 which will oppose the pressure spring 14 and modify its effect upon the diaphragm 11 when the regulator is operating to close the switch. When the switch is open, the vacuum of the system will be at its high value and the lever 12 will be in its upper position. As the vacuum decreases, the diaphragm 11 will move upwardly and the fork end 21 of the lever 12 will move downwardly. Before the switch of the regulator can close, the forked end 21 of the lever 12 will engage collar 19 and place spring 15 under tension. This will cause the range adjusting spring 15 to exert a force on the lever 12 which will oppose the spring 14 and thus decrease its effectiveness to close the switch in opposition to the diaphragm 11, and as a result the vacuum of the system will have to fall to a lower value than before in order to permit spring 14 to move lever 12 and arm 13 far enough to operate the switch mechanism and start the vacuum maintaining apparatus. When the vacuum decreases sufficiently to permit the pressure spring 14 to overcome the downward pull on the diaphragm and the force exerted by the spring 15, the arm 13 will move to the left and the pivot of the link 28 will pass over the center of the pivoted link 29 and the spring 24 will then snap the switch into the closed position, as shown in the drawing. It should be noticed in connection with the operation of the range adjusting spring 15 that the pivot of link 28 on the pivoted link 29 has two positions, it being located as shown in the drawing when the regulator operates to open the switch and moved to the right when the switch is opened, where it remains until the regulator has operated to snap the switch into its closed position. As a result of this movement of the pivot of link 28, the lever 12 must move down farther than would be the case if this pivot remained in the position shown in the drawing and it is this feature which permits spring 15 to be effective to vary the range of the regulator on the switch closing limit of the range without affecting the switch opening limit of the range.

Consider now the range adjusting features of the spring 24. Assume that the regulator is in the position shown and is set to open the switch when the vacuum of the system reaches a pressure corresponding to 10 inches of mercury, and that it is desired to change this upper limit or switch opening pressure. To change this upper limit of the range two means are available, one means which, however, is not capable of fine adjustment is to reduce the pressure exerted by pressure spring 14. The other means is by varying the tension on spring 24. This means is capable of a finer adjustment and is therefore more desirable where a small change in the range is desired. To make this adjustment the setscrew 27 is screwed in, this displaces the movable member 26 so as to increase the tension on the spring 24. Now since the arm 13 must move to the right to open the switch, it will be seen that the spring 24 will be extended and if the tension of the spring 24 is increased as suggested it will take more effort on the part of the diaphragm 11 to overcome this additional tension and open the switch, as at this point of the operation the diaphragm 11 will have to overcome the force exerted by the pressure spring 14 and the downward component of force which is exerted by the spring 24 through arm 13, and, therefore, the vacuum will have to increase to a higher value than before in order to open the switch and stop the vacuum producing apparatus.

From the above it will be seen that I have provided a pressure regulator which is capable of adjustment as to the pressures at which it will operate the switch and also one in which different range adjustments can readily be made at either limit of the range.

While I have described my invention as applied to a regulator adapted to control a vacuum system I desire to have it understood that the features herein disclosed are applicable to regulators adapted to control pressure systems, and I aim in the appended claims to cover all changes and modifications within the spirit and scope of my invention.

What I claim as new and desire to secure by Letters Patent of the United States is:—

1. In a pressure regulator, a device operated in accordance with variations in pressure, a spring for opposing the actuation of said device in one direction, cooperating switch contacts opened and closed by said device, the said contacts being operated by said device at a lower limit and at an upper limit of a definite range of pressures, means for adjusting the strain of said spring to shift the said definite range of pressures, a second spring connected to oppose the said first spring, means for adjusting the effectiveness of said second spring to vary one of the said limits of pressure, a third spring cooperating with said contacts and said device for operating said contacts, and means for adjusting the said third spring to vary the other limit of said definite range of pressure.

2. In a pressure regulator, a device operated in accordance with variations in pressure, a spring for opposing the actuation of said device by said pressure, a second spring opposing said first spring for varying the range of said regulator in one direction, means cooperating with said second spring for controlling the time of application of its opposing force, and adjustable resilient means cooperating with said device for varying the range of said regulator in the opposite direction.

3. In a pressure regulator, a diaphragm exposed to a varying pressure, a lever adapted to be actuated by said diaphragm, a pressure spring adapted to oppose the actuation of said lever by said diaphragm, an adjustable tension spring cooperating with said lever for modifying the effectiveness of said pressure spring, an arm projecting from said lever, a switch mechanism, a link at the end of said arm, and resilient means cooperating with said link adapted to operate said switch mechanism and modifying the effectiveness of said pressure spring.

4. In a pressure regulator, a diaphragm exposed to a varying pressure, a lever adapted to be actuated by said diaphragm, a pressure spring adapted to oppose the actuation of said lever by said diaphragm, an adjustable tension spring cooperating with said lever for modifying the effectiveness of said pressure spring, an arm projecting from said lever, a switch mechanism, a link at the end of said arm, resilient means cooperating with said link adapted to operate said switch mechanism and modifying the effectiveness of said pressure spring, and means for adjusting the resiliency of said resilient means.

5. In a pressure regulator, a device operated between limits in accordance with variations in pressure, a spring for opposing the actuation of said device by said pressure, a second spring opposing said first spring for varying the range of said regulator, an adjustable support for said second spring, and a collar cooperating with said support for operatively connecting said second spring to said device, the said connections providing for said second spring to oppose movement of said device in one direction to one of said limits and providing for the device to be freed from the influence of said second spring during final movement of the device to its other limit.

6. In a pressure regulator, a diaphragm exposed to a varying pressure, a lever adapted to be actuated by said diaphragm, a pressure spring adapted to oppose the actuation of said lever by said diaphragm, an adjustable tension spring cooperating with said lever to modify the effectiveness of said pressure spring, a switch mechanism adapted to be operated by said lever and a stop cooperating with said adjustable tension spring to limit the effect thereof in the switch opening direction.

7. In a pressure regulator, a diaphragm exposed to a varying pressure, a lever adapted to be actuated by said diaphragm, a pressure spring adapted to oppose the actuation of said lever by said diaphragm, a tension spring for modifying the effectiveness of said pressure spring, a switch mechanism adapted to be operated by said lever, an adjustable support for said tension spring, a collar on said adjustable support adapted to engage said lever and connect said tension spring to said lever when the regulator is operating to move said switch mechanism in one direction and a stop on said adjustable support adapted to limit the movement of said collar when the regulator is operating to move the switch mechanism in the opposite direction.

8. In a pressure regulator, a casing, a diaphragm in said casing exposed to a varying pressure, a lever adapted to be actuated by said diaphragm, a pressure spring adapted to oppose the actuation of said lever by said diaphragm, an arm projecting from said lever for operating a switch mechanism, a link pivoted at the end of said arm and connected to said switch mechanism, a second spring connected to said link for biasing it downwardly, a movable member pivoted to said casing for securing the other end of said spring, and means for varying the relative position of said movable member for the purpose of modifying the effectiveness of said spring upon said regulator.

9. In a pressure regulator a casing, a diaphragm exposed to a varying pressure, a lever adapted to be actuated by said diaphragm, switch mechanism adapted to be operated by said lever, a pressure spring adapted to oppose the actuation of said lever by said diaphragm, a tension spring for modifying the effectiveness of said pressure spring, an adjustable support for said tension spring, a collar on said adjustable support adapted to engage said lever and connect said tension spring to said lever when the regulator is operating to move said switch mechanism in one direction and thereby oppose said pressure spring, and a stop on said adjustable support adapted to engage said casing to limit the movement of said collar when the regulator is operating to move said switch in the other direction and thereby relieve the effect of said tension spring on said lever.

10. In a circuit controller, the combination of a pivoted member, a non-conducting member secured to the end of said pivoted member, cross arms at the end of said non-conducting member, a pair of stationary contacts, contact bridging members, pins extending through the end of said cross arms secured to said contact bridging members, and resilient means surrounding said pins for biasing said contact bridging member toward said stationary contacts.

In witness whereof, I have hereunto set my hand this 14th day of March, 1924.

TERRY T. KING.